(12) United States Patent
Kurahashi et al.

(10) Patent No.: US 11,499,921 B2
(45) Date of Patent: Nov. 15, 2022

(54) INSPECTION METHOD AND INSPECTION SYSTEM FOR PILLAR-SHAPED HONEYCOMB STRUCTURE

(71) Applicant: NGK INSULATORS, LTD., Nagoya (JP)

(72) Inventors: Ryota Kurahashi, Nagoya (JP); Yoshihiro Sato, Nissin (JP); Takafumi Terahai, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 63 days.

(21) Appl. No.: 17/203,901

(22) Filed: Mar. 17, 2021

(65) Prior Publication Data
US 2021/0302326 A1 Sep. 30, 2021

(30) Foreign Application Priority Data

Mar. 27, 2020 (JP) .............................. JP2020-058381

(51) Int. Cl.
*G01N 21/88* (2006.01)
*G01N 21/55* (2014.01)
*G01N 21/59* (2006.01)
*G06T 7/00* (2017.01)
*G06T 7/70* (2017.01)
*G06T 7/521* (2017.01)

(52) U.S. Cl.
CPC ......... *G01N 21/8851* (2013.01); *G01N 21/55* (2013.01); *G01N 21/59* (2013.01); *G06T 7/0004* (2013.01); *G06T 7/521* (2017.01); *G06T 7/70* (2017.01); *G01N 2021/558* (2013.01); *G06T 2207/30164* (2013.01)

(58) Field of Classification Search
CPC .... G01N 21/8851; G01N 21/55; G01N 21/59; G01N 2021/558; G06T 7/521; G06T 7/70; G06T 7/0004; G06T 2207/30164
See application file for complete search history.

(56) References Cited

U.S. PATENT DOCUMENTS 7,701,570 B2 * 4/2010 Gargano .......... G01N 21/95692
356/237.6

* cited by examiner

*Primary Examiner* — Jamil Ahmed
(74) *Attorney, Agent, or Firm* — Burr & Brown, PLLC

(57) ABSTRACT

A method for inspecting a pillar-shaped honeycomb structure includes steps of: capturing a pattern of reflected light from an end face with a camera and generating an image data of the pattern of the reflected light; distinguishing positional information of each of cells adjacent to an outer peripheral side wall and cells that are not adjacent to the outer peripheral side wall based on the image data of the pattern of the reflected light, and storing the distinguished positional information in a memory; capturing a pattern of transmitted light from the end face with the camera and generating an image data of the pattern of the transmitted light; measuring intensity of each transmitted light from the cells adjacent to the outer peripheral side wall to detect the cells having defective plugged portions that are adjacent to the outer peripheral side wall based on the generated image data of the pattern of the transmitted light and the positional information; and measuring intensity of each transmitted light from the cells that are not adjacent to the outer peripheral side wall to detect the cells having defective plugged portions that are not adjacent to the outer peripheral side wall based on the generated image data of the pattern of the transmitted light and the positional information.

6 Claims, 9 Drawing Sheets

Image Example of Pattern of Transmitted Light

Image Example of Pattern of Reflected Light

INSPECTION METHOD AND INSPECTION SYSTEM FOR PILLAR-SHAPED HONEYCOMB STRUCTURE

FIELD OF THE INVENTION

The present invention relates to an inspection method and an inspection system for a pillar-shaped honeycomb structure.

BACKGROUND OF THE INVENTION

An exhaust gas emitted from an internal combustion engine such as diesel engines contains a large amount of carbon-based particulates (particulate matters) that cause environmental pollution. Therefore, in general, an exhaust system of a diesel engine or the like is equipped with a filter (Diesel Particulate Filter: DPF) for collecting the particulates. In recent years, the particulates emitted from gasoline engines have also become a problem, and the gasoline engines have also been equipped with a filter (Gasoline Particulate Filter: GPF).

Known as a filter is a wall flow type pillar-shaped honeycomb structure including: an outer peripheral wall; a plurality of first cells disposed on an inner peripheral side than the outer peripheral wall, the first cells extending from a first end face to a second end face in a height direction, the first end face being opened and the second end face having plugged portions; and a plurality of second cells disposed on the inner peripheral side than the outer peripheral wall and arranged to be adjacent to the first cells across a partition wall, the second cells extending from the first end face to the second end face in the height direction, the first end face having plugged portions and the second end face being opened.

In a filter having a pillar-shaped honeycomb structure having plugged portions, the plugged portions play a role of preventing captured particulate matters from leaking out of the filter. Therefore, it is important to form the plugged portions at predetermined positions with a predetermined depth, in terms of ensuring filter performance.

Thus, Patent Literature 1 (U.S. Pat. No. 7,701,570) proposes an inspection method and system for a pillar-shaped honeycomb structure having plugged portions. It discloses a method of detecting a defective plugged portion in a pillar-shaped honeycomb structure, comprising the steps of launching light into a first end face of the pillar-shaped honeycomb structure having plugged portions; receiving the light by a translucent projection medium that contacts the second end face of the pillar-shaped honeycomb structure, wherein the light is visualized as a light spot on the projection medium.

CITATION LIST

Patent Literatures

[Patent Literature 1] U.S. Pat. No. 7,701,570

SUMMARY OF THE INVENTION

Patent Literature 1 proposes a method of detecting a defective plugged portion by launching light into a first end face and capturing a pattern of transmitted light emerging at a second end face with a camera. However, when the light launched into the first end face and/or ambient light sneaks from the outer peripheral side wall of the pillar-shaped honeycomb structure, the intensity of the transmitted light from the cells adjacent to the outer peripheral side wall tends to be increased as compared with that of the transmitted light from the cells on the inner peripheral side. Further, on the contrary, when the light from the outer peripheral side wall is blocked in order to suppress the sneaking of the light, the intensity of the transmitted light from the cells adjacent to the outer peripheral side wall tends to be decreased as compared with that of the transmitted light from the cells on the inner peripheral side, because the outer peripheral side wall of the pillar-shaped honeycomb structure is generally thicker than the partition wall. In this case, especially in defective cells having deeply-formed plugged portions, the intensity of transmitted light lowers, so that the detection accuracy is decreased. In any case, it is found that there is a problem that when both the cells are inspected according to the same criteria, the detection accuracy of the defective cells is decreased.

Further, the intensity of transmitted light by which positions of the cells adjacent to the outer peripheral side wall can be easily identified is different from the intensity of transmitted light by which positions of the cells on the inner peripheral side can be easily identified. Therefore, it is found that the adjustment of the intensity of the transmitted light such that the positions of the cells on the inner peripheral side can be accurately determined causes a problem that the inspection accuracy of the defective cells adjacent to the outer peripheral side wall is decreased, because in either case where the intensity of the transmitted light from the cells adjacent to the outer peripheral side wall is higher or lower than that of the transmitted light from the cells on the inner peripheral side, the accuracy of identifying the positions of the cells adjacent to the outer peripheral side wall is decreased.

The present invention has been created in view of the above circumstances. In one embodiment of the present invention, an object is to provide a method for inspecting a pillar-shaped honeycomb structure having plugged portions, which contributes to improvement of the detection accuracy of the defective cells. In another embodiment of the present invention, an object is to provide a system for inspecting a pillar-shaped honeycomb structure having plugged portions, which contributes to improvement of the detection accuracy of the defective cells.

As a result of intensive studies to solve the above problems, the present inventors have found that the positions of the cells adjacent to the outer peripheral side wall can be easily distinguished from the positions of the cells on the inner peripheral side than the cells adjacent to the outer peripheral side wall by irradiating the end face of the pillar-shaped honeycomb structure with light and imaging a pattern of the reflected light from the end face. Based on this, the present inventors have found that the detection accuracy of the defective cells can be improved by adopting different criteria for the cells adjacent to the outer peripheral side wall and the cells on the inner peripheral side (i.e., the cells that are not adjacent to the outer peripheral side wall) and using the intensity of the transmitted light from the end face in order for inspecting the presence or absence of defective cells. The present invention has been completed based on the above findings, and is illustrated below.

[1]

A method for inspecting a pillar-shaped honeycomb structure, the pillar-shaped honeycombs structure comprising: an outer peripheral side wall; a plurality of first cells disposed on an inner peripheral side than the outer peripheral side wall, each of the first cells extending from a first end face to a second end face, the first end face being opened and the second end face having plugged portions; and a plurality of second cells disposed on the inner peripheral side than the outer peripheral side wall, each of the second cells extending from the first end face to the second end face, the first end face having plugged portions and the second end face being opened, the first cells and the second cells being alternately arranged adjacent to each other interposing a partition wall therebetween, the method comprising steps of:

irradiating the second end face with a first light, capturing a pattern of reflected light from the second end face according to arrangement of each of the plugged portions of the first cells and the second cells with a camera, and generating an image data of the pattern of the reflected light;

distinguishing positional information of each of the second cells adjacent to the outer peripheral side wall and the second cells that are not adjacent to the outer peripheral side wall based on the generated image data of the pattern of the reflected light, and storing the positional information in a memory;

irradiating the first end face with a second light, capturing a pattern of transmitted light from the second end face according to arrangement of each of the plugged portions of the first cells and the second cells with the camera, and generating an image data of the pattern of the transmitted light;

based on the generated image data of the pattern of the transmitted light and the positional information stored in the memory, measuring intensity of each transmitted light from the second cells adjacent to the outer peripheral side wall, and comparing at least one first criterion for the intensity of the transmitted light with the intensity of the transmitted light to detect the second cells having defective plugged portions that are adjacent to the outer peripheral side wall, wherein the first criterion has been preset for identifying the second cells having the defective plugged portions that are adjacent to the outer peripheral side wall, or is determined based on the measured results; and based on the generated image data of the pattern of the transmitted light and the positional information stored in the memory, measuring intensity of each transmitted light from the second cells that are not adjacent to the outer peripheral side wall, and comparing at least one second criterion for the intensity of the transmitted light with the intensity of the transmitted light to detect the second cells having defective plugged portions that are not adjacent to the outer peripheral side wall, wherein the second criterion has been preset for identifying the second cells having the defective plugged portions that are not adjacent to the outer peripheral side wall, or is determined based on the measured results.

[2]

The method according to [1], wherein the at least one first criterion has both the first criterion for the intensity of the transmitted light, which has been preset for identifying the second cells having the defective plugged portions that are adjacent to the outer peripheral side wall, and the first criterion for the intensity of the transmitted light, which is determined based on the measured results, and wherein the at least one second criterion has both the second criterion for the intensity of the transmitted light which has been preset for identifying the second cells having the defective plugged portions that are not adjacent to the outer peripheral side wall, and the second criterion for the intensity of the transmitted light which is determined based on the measured results.

[3]

The method according to [1] or [2], wherein the pattern of the reflected light and the pattern of the transmitted light are simultaneously captured with the camera by using the first light and the second light having different wavelengths from each other.

[4]

A system for inspecting a pillar-shaped honeycomb structure, the pillar-shaped honeycombs structure comprising: an outer peripheral side wall; a plurality of first cells disposed on an inner peripheral side than the outer peripheral side wall, each of the first cells extending from a first end face to a second end face, the first end face being opened and the second end face having plugged portions; and a plurality of second cells disposed on the inner peripheral side than the outer peripheral side wall, each of the second cells extending from the first end face to the second end face, the first end face having plugged portions and the second end face being opened, the first cells and the second cells being alternately arranged adjacent to each other interposing a partition wall therebetween, the system comprising:

a light irradiator for irradiating the second end face with a first light;

a light irradiator for irradiating the first end face with a second light;

a camera for capturing a pattern of reflected light and a pattern of transmitted light from the second end face; and a computer capable of:

generating an image data of the pattern of the reflected light captured by the camera and an image data of the pattern of the transmitted light captured by the camera;

distinguishing positional information of each of the second cells adjacent to the outer peripheral side wall and the second cells that are not adjacent to the outer peripheral side wall based on the generated image data of the pattern of the reflected light, and storing the distinguished positional information in a memory;

based on the generated image data of the pattern of the transmitted light and the positional information stored in the memory, measuring intensity of each transmitted light from the second cells adjacent to the outer peripheral side wall, and comparing at least one first criterion for the intensity of the transmitted light with the intensity of the transmitted light to detect the second cells having defective plugged portions that are adjacent to the outer peripheral side wall, wherein the first criterion has been preset for identifying the second cells having the plugged portions that are adjacent to the outer peripheral side wall, or is determined based on the measured results; and based on the generated image data of the pattern of the transmitted light and the positional information stored in the memory, measuring intensity of each transmitted light from the second cells that are not adjacent to the outer peripheral side wall, and comparing at least one second criterion for the intensity of the transmitted light with the intensity of the transmitted light to detect the second cells having defective plugged portions that are not adjacent to the outer peripheral side wall, wherein the second criterion has been preset for identifying the second cells having the defective plugged portions that are not adjacent to the outer peripheral side wall, or is determined based on the measured results.

[5]

The system according to [4],
wherein the least one first criterion has both the first criterion for the intensity of the transmitted light which has been preset for identifying the second cells having the defective plugged portions that are adjacent to the outer peripheral side wall, and the first criterion for the intensity of the transmitted light which is determined based on the measured results, and wherein the second criterion has both the second criterion for the intensity of the transmitted light, which has been preset for identifying the second cells having the defective plugged portions that are not adjacent to the outer peripheral side wall, and the second criterion for the intensity of the transmitted light, which is determined based on the measured results.

[6]

The system according to [4] or [5], wherein the light irradiator for irradiating with the first light can irradiate with light having a wavelength different from the light irradiator for irradiating with the second light.

According to an embodiment of the present invention, it is possible to improve detection accuracy of defective cells when inspecting a pillar-shaped honeycomb structure having plugged portions.

DETAILED DESCRIPTION OF THE INVENTION

Embodiments according to the present invention will now be described in detail with reference to the drawings. It should be understood that the present invention is not intended to be limited to the following embodiments, and any change, improvement or the like of the design may be appropriately added on the basis of ordinary knowledge of those skilled in the art without departing from the spirit of the present invention.

(1. Pillar-Shaped Honeycomb Structure)

Figure 2:
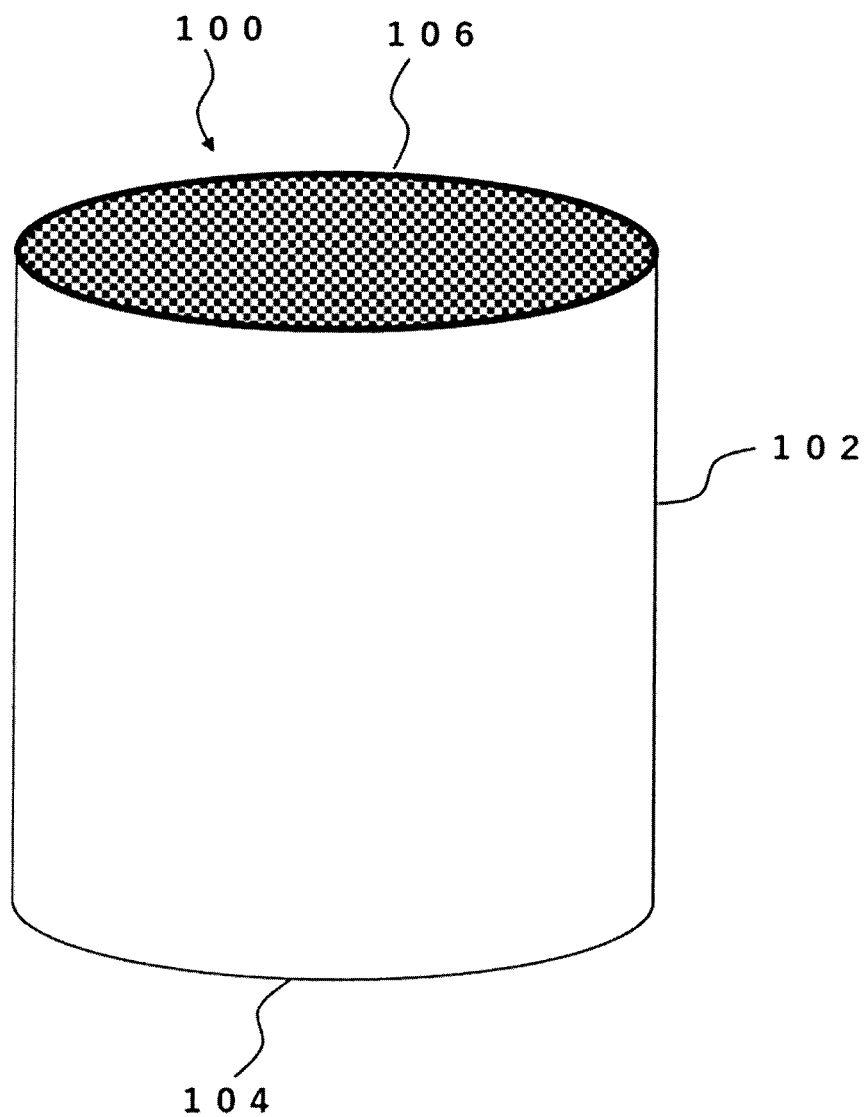
FIG. 2 is a perspective view schematically showing a wall-flow type ceramic fired body.
Figure 3:
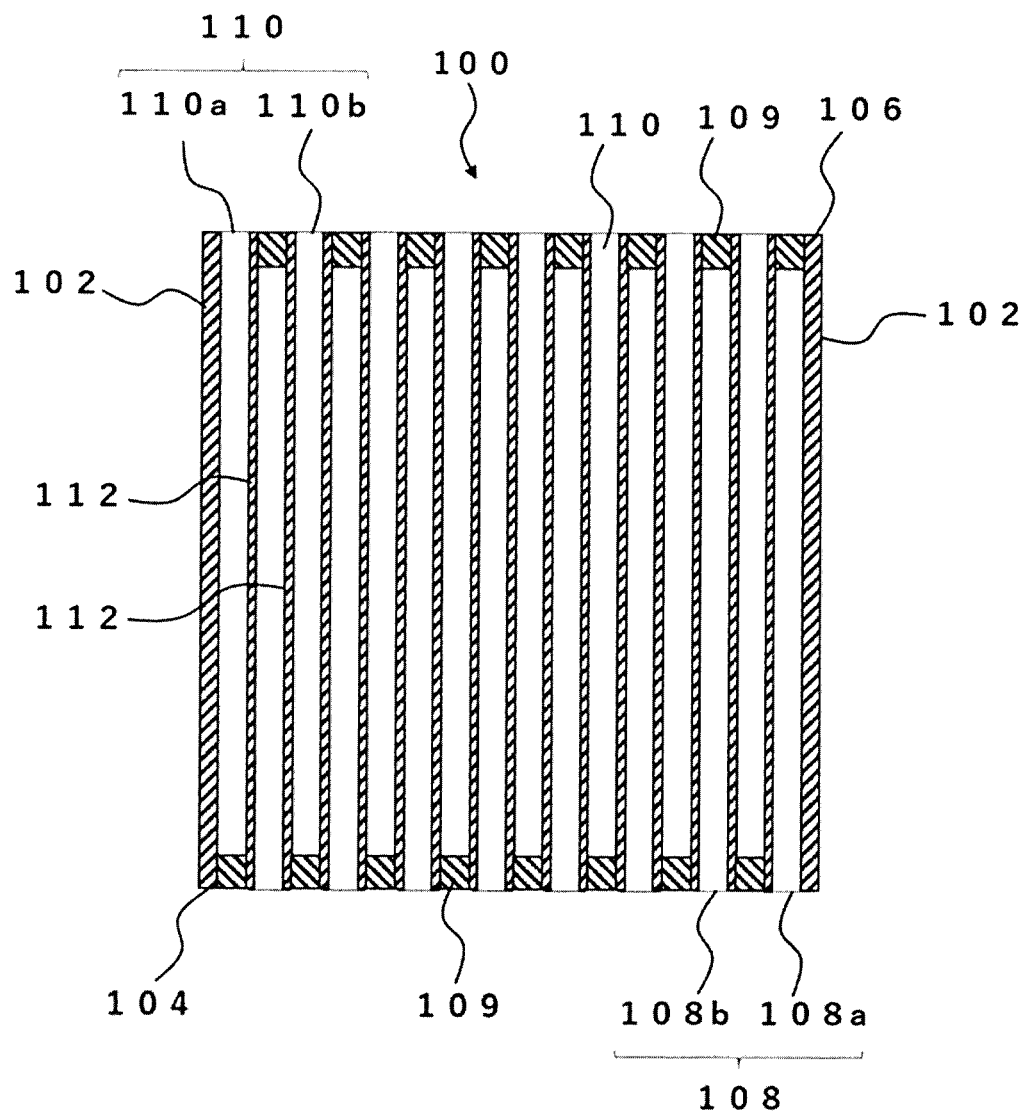
FIG. 3 is a schematic cross-sectional view of a wall-flow type ceramic fired body as observed from a direction orthogonal to a cell-extending direction.

FIGS. 2 and 3 illustrate a schematic perspective view and a cross-sectional view of a pillar-shaped honeycomb structure (100) applicable as a wall-flow type automobile exhaust gas filter and/or a catalyst support, respectively. The pillar-shaped honeycomb structure (100) includes: a plurality of first cells (108) disposed on an inner peripheral side than an outer peripheral side wall (102), the first cells (108) extending from a first end face (104) to a second end face (106), the first end surface (104) being opened and the second end face (106) having plugged portions (109); and a plurality of second cells (110) disposed on an inner peripheral side than an outer peripheral side wall (102), the second cells (110) extending from the first end face (104) to the second end face (106), the first end face (104) having plugged portions (109), and the second end face (106) being opened. In the pillar-shaped honeycomb structure (100), the first cells (108) and the second cells (110) are alternately arranged adjacent to each other interposing a partition wall (112) therebetween.

The first cells (108) can be classified into first cells (108a) adjacent to the outer peripheral side wall (102) and first cells (108b) that are not adjacent to the outer peripheral side wall (102). Similarly, the second cells (110) can be classified into second cells (110a) adjacent to the outer peripheral side wall (102) and second cells (110b) that are not adjacent to the outer peripheral side wall (102).

When an exhaust gas containing particulate matters such as soot is fed to the first end face (104) on an upstream side of the pillar-shaped honeycomb structure (100), the exhaust gas is introduced into the first cells (108) and proceeds in the first cells (108) toward the downstream. Since the first cells (108) are plugged on the second end face (106) on the downstream side, the exhaust gas passes through the porous partition walls (112) partitioning the first cell (108) from the second cell (110), and flows into the second cells (110). Since the particulate matters cannot pass through the partition walls (112), they are collected and deposited in the first cells (108). After the particulate matters are removed, the clean exhaust gas that has flowed into the second cells (110) proceeds toward the downstream in the second cells (110) and flows out of the second end face (106) on the downstream side.

Examples of shapes of the end faces of the pillar-shaped honeycomb structure include, but not limited to, a polygonal shape or irregular shape such as a circular shape, an elliptical shape, a race track shape, an oval shape, a triangular shape, a substantially triangular shape, a quadrangular shape, and a substantially quadrangular shape. The illustrated pillar-shaped honeycomb structure (100) has circular end faces and has a cylindrical shape as a whole.

Examples of shapes of the cells in the cross-section perpendicular to the flow path direction of the cells include, but not limited to, preferably a quadrangle, a hexagon, an octagon, or a combination thereof. Among them, a square and hexagon are preferred. Such a cell shape results in a decreased pressure loss when the fluid passes through the honeycomb fired body, so that purification performance of a catalyst can be improved.

A cell density (the number of cells per unit cross-sectional area) is not particularly limited, and it may be, for example, from 6 to 2000 cells/square inch (from 0.9 to 311 cells/cm$^2$). Here, the cell density is calculated by dividing the number of cells on one end face (including the plugged cells) by the area of the end face excluding the outer peripheral side wall.

There is no limitation for the thickness of the partition wall (112), and the thickness may be, for example, from 50 μm to 330 μm.

There is no limitation for the height (a length from the first end face to the second end face), including, and the height may be, for example, from 40 mm to 300 mm.

The pillar-shaped honeycomb structure having the plugged portions can be produced by a known production method, which will be described below as an example. First, a raw material composition containing a ceramic raw material, a dispersion medium, a pore former and a binder is kneaded to form a green body. The green body is then extruded to form a desired pillar-shaped honeycomb structure. After the pillar-shaped honeycomb structure is dried, plugged portions are formed on both end faces of the pillar-shaped honeycomb structure, and the plugged portions are then dried to obtain a pillar-shaped honeycomb structure having the plugged portions. After that, the pillar-shaped honeycomb structure is generally subjected to degreasing and firing to be provided as a ceramic fired body. The inspection of the plugged portions may be carried out for the pillar-shaped honeycomb structure before firing, or may be carried out for the pillar-shaped honeycomb structure after firing.

2. First Embodiment

Figure 1A:
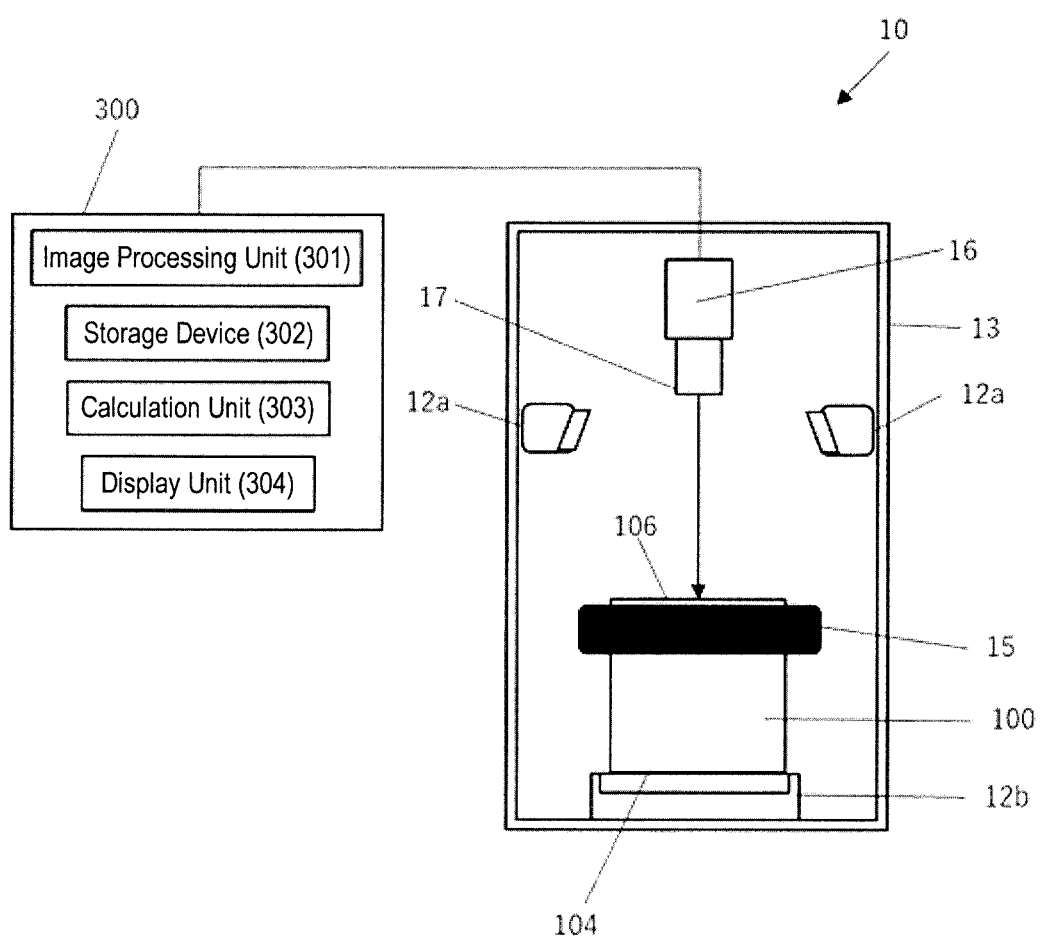
FIG. 1A is a schematic side view for explaining a configuration of an inspection system according to a first embodiment of the present invention.

FIG. 1A shows a schematic side view for explaining a configuration of an inspection system (10) according to a first embodiment of the present invention.

The inspection system (10) includes:
a light irradiator (12a) for irradiating the second end face (106) with a first light;
a light irradiator (12b) for irradiating the first end face (104) with a second light; and
a camera (16) for capturing a pattern of reflected light and a pattern of transmitted light from the second end face (106).

The inspection system (10) also includes: a computer (300) having an image processing unit (301), a memory (302), a calculation unit (303), and a display unit (304).

The image processing unit (301) can generate an image data of the pattern of the reflected light captured by the camera and an image data of the pattern of the transmitted light captured by the camera.

The memory (302) can distinctively store positional information of each of the second cells (110a) adjacent to the outer peripheral side wall (102) and the second cells (110b) that are not adjacent to the outer peripheral side wall (102) based on the generated image data of the pattern of the reflected light.

Based on the generated image data of the pattern of the transmitted light and the positional information stored in the memory (302), the calculation unit (303) can measure intensity of each transmitted light from the second cells (110a) adjacent to the outer peripheral side wall (102), and comparing at least one first criterion for the intensity of the transmitted light with the intensity of the transmitted light to detect the second cells (110a) having defective plugged portions (109) that are adjacent to the outer peripheral side wall (102), wherein the first criterion has been preset for identifying the second cells (110a) having the plugged portions that are adjacent to the outer peripheral side wall (102), or is determined based on the measured results.

Based on the generated image data of the pattern of the transmitted light and the positional information stored in the memory (302), the calculation unit (303) can also measure intensity of each transmitted light from the second cells (110b) that are not adjacent to the outer peripheral side wall (102), and comparing at least one second criterion for the intensity of the transmitted light with the intensity of the transmitted light to detect the second cells (110b) having defective plugged portions (109) that are not adjacent to the outer peripheral side wall (102), wherein the second criterion has been preset for identifying the second cells (110b) having the plugged portions (109) that are not adjacent to the outer peripheral side wall (102), or is determined based on the measured results.

The display unit (304) can display the image of the pattern of the reflected light and the image of the pattern of the transmitted light based on the image data of the pattern of the reflected light and the image data of the pattern of the transmitted light generated by the image processing unit (301). The display unit can be composed of a display such as an LCD or an organic EL.

In an embodiment, the inspection system (10) can include the light irradiators (12a, 12b), the camera (16), and a housing (13) for accommodating the pillar-shaped honeycomb structure (100). The housing (13) can be configured to block light from the outside. This can allow the inspection to be performed in a dark environment, thereby improving the inspection accuracy.

The light irradiator (12a) is disposed at a position where it can irradiate the second end face (106) of the pillar-shaped honeycomb structure (100) with the first light. In the inspection system (10) according to the illustrated embodiment, the light irradiator (12a) is disposed above the second end face (106) of the pillar-shaped honeycomb structure (100), and is configured to be able to deliver the light downward. Preferably, the light irradiator (12a) isotropically irradiate the second end surface (106) with the light. Therefore, for example, preferable irradiation methods include the irradiation with the light from directly above the second end face (106) using a ring lighting device or a coaxial lighting device as the light irradiator (12a), and the irradiation of the second end face with the light that is symmetric about a central axis of the pillar-shaped honeycomb structure (100) as a center of the symmetry with one or more pairs of light irradiators (12a) as illustrated in the drawings.

The light irradiator (12b) is disposed at a position where it can irradiate the first end face (104) of the pillar-shaped honeycomb structure (100) with the second light. In the inspection system (10) according to the illustrated embodiment, the light irradiator (12b) is configured to be able to deliver the second light upward. The system is configured to arrange the pillar-shaped honeycomb structure (100) directly above a light source of the light irradiator (12b) such that the first end face (104) is located on the lower side. For the light source, in terms of uniformly irradiating the first end face (104) with the light, the light source facing the first end face (104) preferably spreads over an area larger than that of the first end face (104), although it depends on a diffusion angle of the light from the light source and a distance to the first end face (104). For example, the irradiation with the light can be carried out at an output such that an illuminance of the first end face (104) is 10,000 lx or more.

The light sources of the light irradiators (12a, 12b) include, but not particularly limited to, an LED, an incandescent light bulb, and a halogen lamp. These light sources can generally irradiate with a diffused light. A wavelength of the light to be delivered is also not particularly limited as long as it is a wavelength within which the camera has a light receiving sensitivity. Therefore, it is also possible to irradiate with white light. An output of the light to be irradiated is also not particularly limited, but a higher output is preferable, because the higher output can allow the transmitted light intensity to be ensured for a short exposure time or the influence of disturbance to be reduced even if the height of the pillar-shaped honeycomb structure (100) is large and the plugged portions are deeper.

In Patent Literature 1, a collimator lens is arranged between the light irradiator (12b) and the pillar-shaped honeycomb structure (100) such that collimated light can be obtained, whereas, in the present embodiment, it is not necessary to use the collimated light. Therefore, in one embodiment of the present invention, the collimator lens is not arranged between the light irradiator (12b) and the pillar-shaped honeycomb structure (100). Therefore, in one embodiment, the pillar-shaped honeycomb structure (100) may be placed so as to be in contact with the light irradiator (12b) (see FIGS. 1A to 1D). The contact of the pillar-shaped honeycomb structure (100) with the light source is advantageous in terms of the intensity of the transmitted light and the uniformity of the light.

Figure 1B:
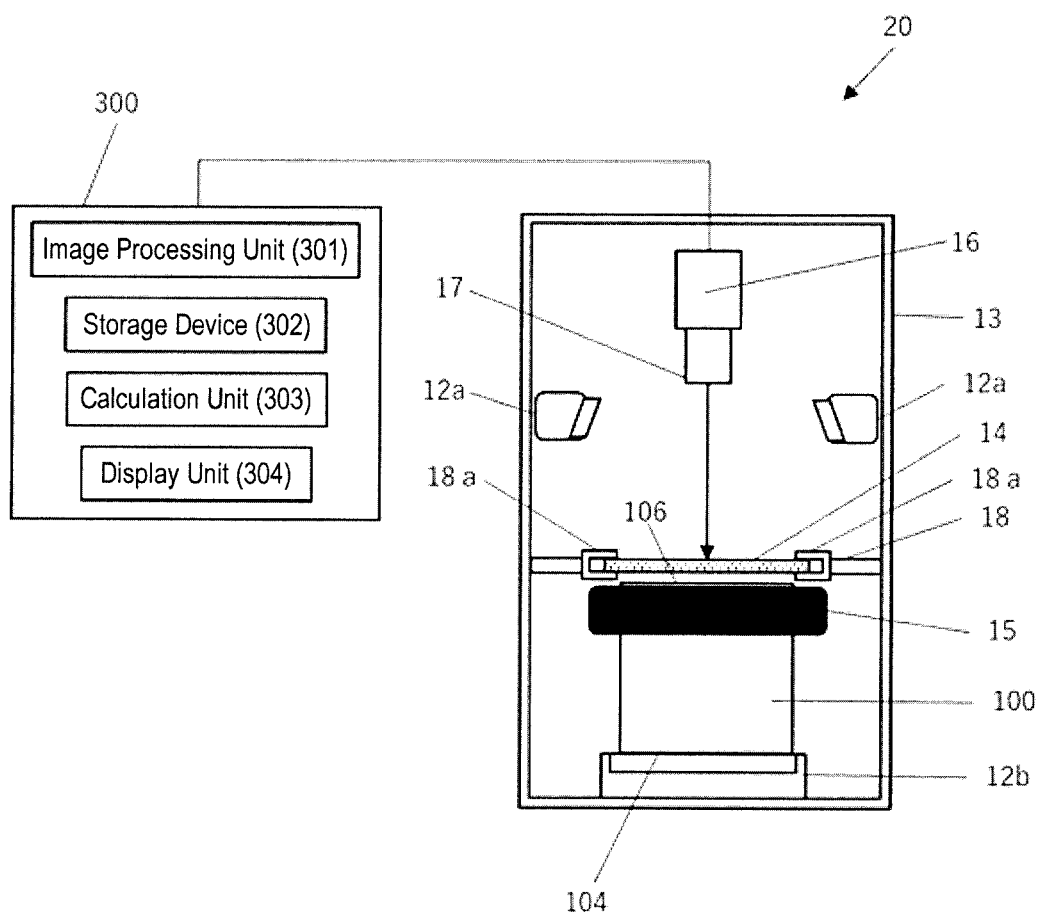
FIG. 1B is a schematic side view for explaining a configuration of an inspection system according to a second embodiment of the present invention.
Figure 1C:
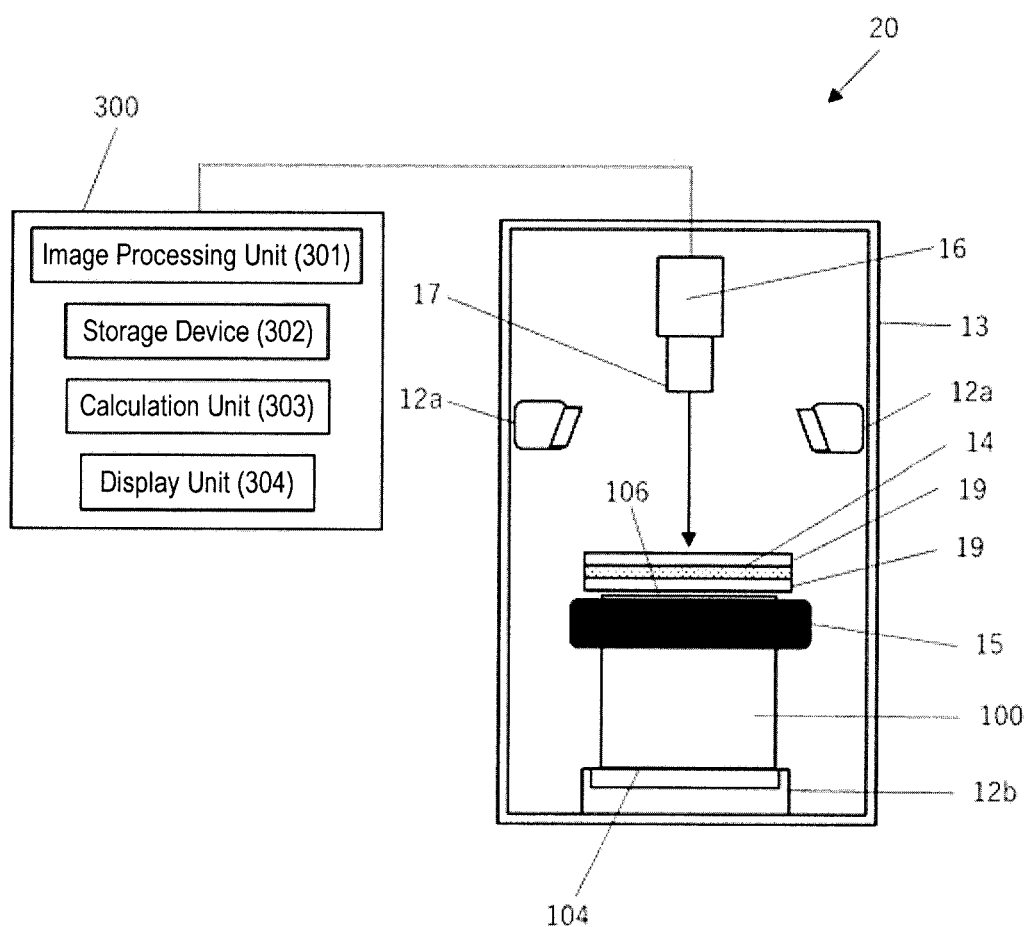
FIG. 1C is a schematic side view for explaining another configuration of the inspection system according to the second embodiment of the present invention.
Figure 1D:
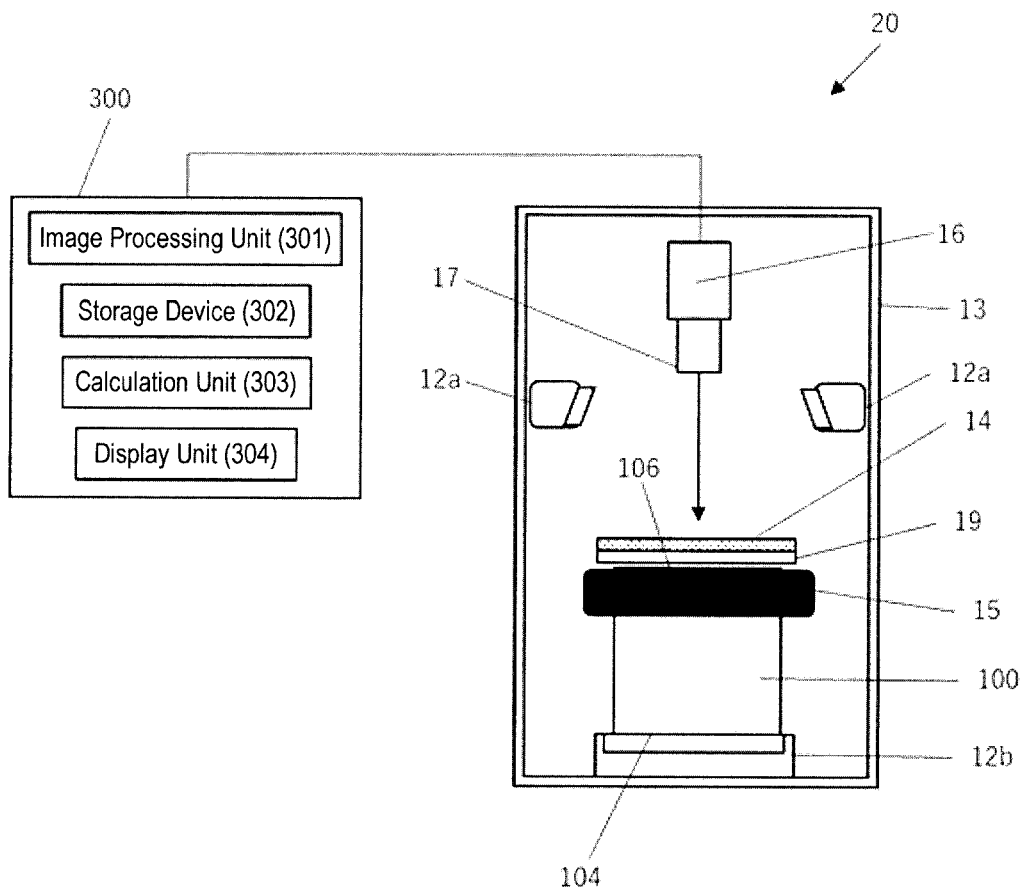
FIG. 1D is a schematic side view for explaining yet another configuration of the inspection system according to the second embodiment of the present invention.
Figure 1E:
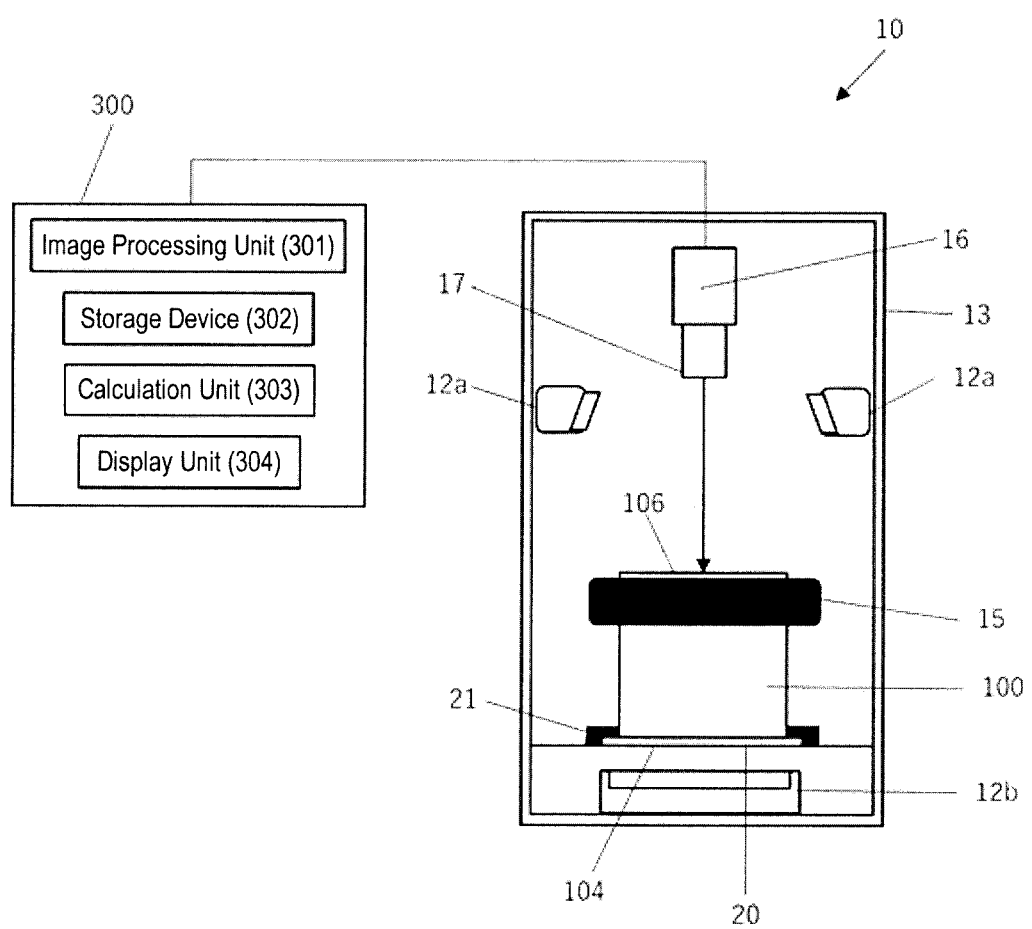
FIG. 1E is a schematic side view for explaining another configuration of the inspection system according to the first embodiment of the present invention.

Further, in another embodiment, to prevent the pillar-shaped honeycomb structure (100) from being in contact with the light irradiator (12b), a translucent substrate (20) may be sandwiched between the pillar-shaped honeycomb structure (100) and the light irradiator (12b) (see FIG. 1E). Examples of the translucent substrate (20) include a transparent substrate and a semitransparent substrate. The semitransparent substrate such as frosted glass is preferable because it eliminates non-uniformity of light from the light source. The irradiation of the first end face (104) with the light can be performed in a state where the pillar-shaped honeycomb structure (100) is placed on the translucent substrate (20). Further, in order to prevent the light passing through the translucent substrate (20) from illuminating the outer peripheral side wall (102) of the honeycomb structure (100), a ring-shaped light shielding member (21) surrounding the outer peripheral portion of the translucent substrate (20) which protrudes from the outer peripheral side wall (102) of the honeycomb structure (100), may be arranged. The light shielding member (21) is effective regardless of the presence or absence of a light shielding annular member (15) such as a balloon chuck, as described later.

As will be described later, the pattern of the reflected light and the pattern of the transmitted light may be simultaneously captured with the camera (16). In this case, it is preferable that the first light and the second light have different wavelengths such that the camera (16) can distinguish between them. When using a color camera such as an RGB camera, one light has a red color having a wavelength of from 400 to 500 nm and the other light has a blue color having a wavelength of from 600 to 800 nm, which is a combination that can be easily realized within the range of visible light, although it depends on the wavelength band at which the camera has the sensitivity, and whether the wavelength of the irradiated light interferes with each color of the image.

The camera (16) is arranged at a position where it can capture the pattern of the reflected light. When the second end face (106) of the pillar-shaped honeycomb structure (100) is irradiated with the first light from the light irradiator (12a), the camera (16) can capture the pattern of the reflected light from the second end face (106) according to the arrangement of each of the plugged portions (109) of the first cells (108) and the second cells (110). In the inspection system (10) according to the illustrated embodiment, the camera (16) is arranged above, preferably directly above, the second end face (106) of the pillar-shaped honeycomb structure (100), and a lens (17) is directed toward the second end face (106), i.e., downward. The camera (16) for capturing the pattern of the reflected light may be either an area camera or a line camera, but the area camera is preferable because it has a fast-imaging tact and a wider illumination width, and can allow an equipment size to be reduced. From the viewpoint of improving the inspection accuracy, the camera for capturing the pattern of the reflected light can preferably have a pixel resolution of 40 μm/pix or less (which means that lengths of one pixel in the horizontal and vertical directions are 40 μm or shorter), typically a pixel resolution of from 20 to 40 μm/pix.

Figure 5:
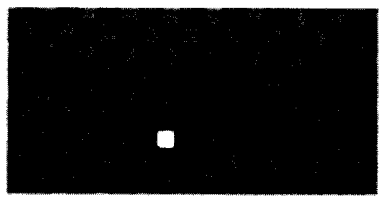
FIG. 5 is image examples of a pattern of transmitted light (left) and an image example of a pattern of reflected light (right).
Figure 5:
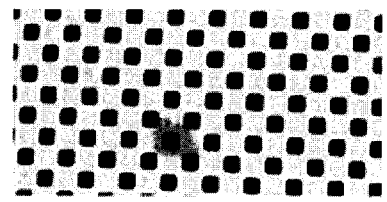

Based on the result of capturing by the camera (16), the computer (300) can generate an image data of the pattern of the reflected light. An example of the generated image of the pattern of the reflected light is shown in FIG. 5. The computer (300) then distinctively stores positional information of the second cells (110a) adjacent to the outer peripheral side wall (102) and the positional information of the second cells (110b) that are not adjacent to the outer peripheral side wall (102) in the memory based on the image data. The positional information can include, for example, information of two-dimensional coordinates constituting the contour of each second cell, whereby the position, shape, and size of each second cell can be identified.

Also, the camera (16) is arranged at a position where it can capture the pattern of the transmitted light. When the first end face (104) of the pillar-shaped honeycomb structure (100) is irradiated with the second light from the light irradiator (12b), the camera (16) can capture the pattern of the transmitted light from the second end face (106) according to the arrangement of each of the plugged portions (109) of the first cells (108) and the second cells (110). In the inspection system (10) according to the illustrated embodiment, the camera (16) is arranged above, preferably directly above, the second end face (106) of the pillar-shaped honeycomb structure (100), and a lens (17) is directed toward the second end face (106), i.e., downward. The camera for capturing the pattern of the transmitted camera may be either an area camera or a line camera, but the area camera is preferable because it has a fast-imaging tact and a wider illumination width, and can allow an equipment size to be reduced. From the viewpoint of improving the inspection accuracy, the camera for capturing the pattern of the transmitted light can preferably have a pixel resolution of 40 μm/pix or less (which means that lengths of one pixel in the horizontal and vertical directions are 40 μm or shorter), typically a pixel resolution of from 20 to 40 μm/pix.

The camera for capturing the pattern of the transmitted light may be the same as or different from the camera for capturing the pattern of the reflected light. However, in a case where switching between the camera for capturing the pattern of the transmitted light and the camera for capturing the pattern of the reflected light is carried out while angles of both the cameras are different, a position correction is required by image processing such that the positions of the cells recognized by both the cameras match to each other. In the inspection system according to the illustrated embodiment, the camera for capturing the pattern of the transmitted light is the same as the camera for capturing the pattern of the reflected light.

Based on the result of capturing by the camera (16), the computer (300) can generate an image data of the pattern of the transmitted light. An example of the generated image of the pattern of the transmitted light is shown in FIG. 5.

Based on the generated image data of the pattern of the transmitted light and the positional information of each second cell stored in the memory (302), the computer (300) measures intensity of each transmitted light from the second cells (110a) adjacent to the outer peripheral side wall (102), and comparing at least one first criterion for the intensity of the transmitted light with the intensity of the transmitted light to detect the second cells (110a) having defective plugged portions (109) that are adjacent to the outer peripheral side wall (102), wherein the first criterion has been preset for identifying the second cells (110a) having the defective plugged portions (109) that are adjacent to the outer peripheral side wall (102), or is determined based on the measured results.

Based on the generated image data of the pattern of the transmitted light and the positional information of each second cell stored in the memory (302), the computer (300) also measures intensity of each transmitted light from the second cells (110b) that are not adjacent to the outer peripheral side wall (102), and comparing at least one second criterion for the intensity of the transmitted light with the intensity of the transmitted light to detect the second cells (110b) having defective plugged portions (109) that are not adjacent to the outer peripheral side wall (102), wherein the second criterion has been preset for identifying the second cells (110b) having the defective plugged portions (109) that are not adjacent to the outer peripheral side wall (102), or is determined based on the measured results.

The intensity of the transmitted light from each of the second cells to be compared with the first or second criterion is not particularly limited as long as it is a value representing the intensity of the transmitted light of the second cells. For example, an average value of luminance of the pixels in each of the second cells on the generated image of the pattern of the transmitted light can be the intensity of the transmitted light of the second cells. Alternatively, the sum of the luminance of the pixels in each of the second cells on the generated image of the pattern of the transmitted light can be the intensity of the transmitted light of the second cells.

The intensity of the transmitted light from the second cells (110a) adjacent to the outer peripheral side wall (102) and the intensity of the transmitted light from the second cells (110b) that are not adjacent to the outer peripheral side wall (102) may tend to be different from each other even if the plugged portions having the same depth are formed in the both of those cells. Therefore, the first criterion for determining the presence or absence of the defective plugged portion(s) (109) of the second cells (110a) that are adjacent to the outer peripheral side wall (102) and the second criterion for determining the presence or absence of the defective plugged portion(s) (109) of the second cells (110b) that are not adjacent to the outer peripheral side wall (102) are changed to adopt a criterion suitable for each, whereby the detection accuracy of the defective plugged portion(s) (109) can be improved.

When the plugged portions (109) of the second cells (110) (i.e., the plugged portions located on the first end face (104) side) have defects such as holes and insufficient depth (hereinafter called as "shallow plugged portions"), the second cells (110) having such defects have higher luminance than the second cells (110) having the normal plugged portions (109) on the image of the pattern of the transmitted light. On the contrary, the second cells (110) in which the plugged portions (109) are excessively deeply formed have lower luminance than the second cells (110) having the normal plugged portions (109). Therefore, if a criterion of the luminance (for example, a specific luminance range) for the second cells (110) having the normal plugged portions (109) is set in advance, it can be determined that the second cells (110) which do not satisfy the criterion have the defective plugged portions (109).

Each of the first criterion and the second criterion for the intensity of the transmitted light may be appropriately set based on empirical rules so that the detection accuracy of the defective cells gets higher. It may also be based on results of making the computer learn by machine learning. Each of the first criterion and the second criterion can have one criterion, or can have multiple criteria.

Hereinafter, a method of setting the criterion for inspecting the presence or absence of the defective cells having the shallow plugged portions will be illustratively described. One of detection modes of the defective cells includes a first inspection mode for detecting a defect by comparing the intensities of the transmitted light among the second cells of the pillar-shaped honeycomb structure to be inspected.

When the second cells having the defective plugged portions, among the second cells adjacent to the outer peripheral side wall, are detected according to the first inspection mode, the first criterion is determined based on the measured results of the intensities of the transmitted light of the second cells adjacent to the outer peripheral side wall of the pillar-shaped honeycomb structure to be inspected, and the second cells having the defective plugged portions are detected. Illustratively, an average value of the intensities of the transmitted light of a predetermined number of the second cells adjacent to the outer peripheral side wall (e.g., 10 or more cells adjacent to each other) can be calculated, and the first criterion can be set based on the average value. Further, the average value of the intensities of the transmitted light of half or more, ¾ or more, or all of the second cells adjacent to the outer peripheral side wall can be calculated, and the first criterion can be set based on the average value. For example, when the intensity of the transmitted light from the specific second cells adjacent to the outer peripheral side wall is higher than the average value of the intensities of the transmitted light beyond a predetermined allowable range (exceeds a predetermined threshold value), those second cells can be determined to be the defective cells having the shallow plugged portions.

Similarly, when the second cells having the defective plugged portions, among the second cells that are not adjacent to the outer peripheral side wall, are detected according to the first inspection mode, the second criterion is determined based on the measured results of the intensities of the transmitted light of the second cells that are not adjacent to the outer peripheral side wall of the pillar-shaped honeycomb structure to be inspected, and the second cells having the defective plugged portions are detected. Illustratively, an average value of the intensities of the transmitted light of a predetermined number (e.g., 2000 or more) of the second cells that are not adjacent to the outer peripheral side wall can be calculated, and the second criterion can be set based on the average value. Further, the average value of the intensities of the transmitted light of half or more, ¾ or more, or all of the second cells that are not adjacent to the outer peripheral side wall can be calculated, and the second criterion can be set based on the average value. For example, when the intensity of the transmitted light from the specific second cells that are not adjacent to the outer peripheral side wall is higher than the average value of the intensities of the transmitted light beyond a predetermined allowable range (exceeds a predetermined threshold value), those second cells can be determined to be the defective cells having the shallow plugged portions.

The first inspection mode is effective when the average value represents the normal second cells, in other words, when there are few second cells having the defective plugged portions. However, if there are many second cells having the defective plugged portions, the inspection accuracy may be decreased. Therefore, as another detection mode of the defective cells, a second inspection mode for detecting a defect by comparing the intensity of the transmitted light of the second cells of the pillar-shaped honeycomb structure to be inspected with the intensity of the transmitted light of the second cells of at least one, preferably more than one of the other pillar-shaped honeycomb structures different from those to be inspected is preferably carried out in place of or in addition to the first inspection mode as described above.

The procedure of the second inspection mode will be illustratively described. First, using a pillar-shaped honeycomb structure different from that to be inspected, the second cells adjacent to the outer peripheral side wall is measured for the intensity of the transmitted light from the second cells having the normal plugged portions when being irradiated with the second light under predetermined conditions. Based on the measured results, the first criterion is set in advance. Specifically, the allowable range or threshold value of the intensity of the transmitted light from the second cells having the normal plugged portions is predetermined for the second cells adjacent to the outer peripheral side wall. The allowable range or threshold can be determined, for example, based on the average value of the intensities of the transmitted light from the second cells having the normal plugged portions.

Similarly, using a pillar-shaped honeycomb structure different from that to be inspected, the second cells that are not adjacent to the outer peripheral side wall is measured for the intensity of the transmitted light from the second cells having the normal plugged portions when being irradiated with the second light under predetermined conditions. Based on the measured results, the second criterion is set in advance. Specifically, the allowable range or threshold value of the intensity of the transmitted light from the second cells having the normal plugged portions is predetermined for the second cells that are not adjacent to the outer peripheral side wall. The allowable range or threshold can be determined, for example, based on the average value of the intensities of the transmitted light from the second cells having the normal plugged portions.

The irradiation with the second light is then carried out under the same conditions as described above, and the intensity of the transmitted light of each of the second cells adjacent to the outer peripheral side wall and the second cells that are not adjacent to the outer peripheral side wall of the pillar-shaped honeycomb structure to be inspected is determined. It is then determined whether or not the intensity of the transmitted light of each of those second cells exceeds the allowable range or threshold value as predetermined above. The second cells having the intensity of the transmitted light higher beyond the predetermined allowable range or threshold value (exceeds the predetermined threshold value) can be determined to be the defective cells having the shallow plugged portions.

The second inspection mode is advantageous in that when there are many second cells having the defective plugged portions, the second cells having the defective plugged portions can be detected with higher accuracy. However, even if the pillar-shaped honeycomb structures each having the normal plugged portions are irradiated with the second light under the same conditions, the intensity of the transmitted light may vary among those products. The pillar-shaped honeycomb structures industrially produced have a dimensional error, and the intensity of transmitted light may vary due to a change in squareness. Therefore, the criterion for determining the presence or absence of the plugged portions, which is set according to the second inspection mode, is not universal.

Therefore, in terms of improving the inspection accuracy, it is preferable to combine the first inspection mode with the second inspection mode. When combining the first inspection mode with the second inspection mode, the first criterion has two first criteria of the first criterion in the first inspection mode and the first criterion in the second inspection mode. The second criterion also has two criteria of the second criterion in the first inspection mode and the second criterion in the second inspection mode. Therefore, each of the second cells adjacent to the outer peripheral side wall is determined to be the second cell having the normal plugged portion when satisfying the two criteria of the first criterion in the first inspection mode and the first criterion in the second inspection mode. Similarly, each of the second cells that are not adjacent to the outer peripheral side wall is determined to be the second cell having the normal plugged portion when satisfying the two criteria of the second criterion in the first inspection mode and the second criterion in the second inspection mode.

Thus, the combination of the first inspection mode with the second inspection mode can allow the inspection to be carried out with higher accuracy, in both of the case where the second cells having the defective plugged portions are locally present and the case where they are generally present.

For the order of capturing the pattern of the reflected light and the pattern of the transmitted light, for example, the following methods are considered: a method of capturing the pattern of the reflected light at first and then capturing the pattern of the transmitted light; a method of capturing the pattern of the transmitted light at first and then capturing the pattern of the reflected light; and a method of simultaneously capturing the pattern of the reflected light and the pattern of the transmitted light. From the viewpoint of improving an inspection speed, it is desirable to simultaneously capture the pattern of the reflected light and the pattern of the transmitted light with the camera. However, in this case, as described above, it is preferable that the first light and the second light have different wavelengths so that the camera can distinctively recognize the patterns of the reflected light and the transmitted light.

When the pattern of the transmitted light from the second end face (106) is captured with the camera (16), the irradiation of the outer peripheral side surface (102) of the pillar-shaped honeycomb structure (100) with the light from the light irradiator (12*b*) or light from the outside of the inspection system may result in tendency of higher luminance of the plugged portions near the outer peripheral side surface (102), so that the inspection accuracy may be decreased. Therefore, when the pattern of the transmitted light from the second end face (106) is captured with the camera (16), it is preferable that the outer peripheral side surface (102) of the pillar-shaped honeycomb structure (100) is circumferentially covered with a light shielding annular member (15). The light shielding annular member (15) is preferably made of an elastic material such as a rubber and an elastomer so as to flexibly correspond to the size of the pillar-shaped honeycomb structure (100).

Figure 4:
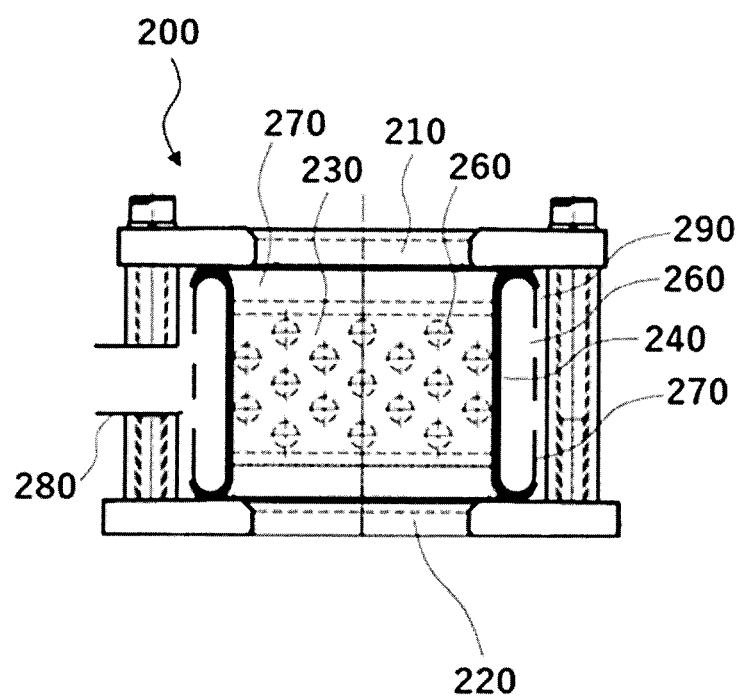
FIG. 4 is a schematic view showing a structural example of a balloon chuck.

As the light shielding annular member (15), a balloon chuck can be preferably used. When the balloon chuck is used, the pressing force from the balloon is easily dispersed over the entire contact surface with the pillar-shaped honeycomb structure (100), and a larger pressure is not likely to be applied locally, so that the pillar-shaped honeycomb structure (100) is difficult to be damaged during fixing. FIG. 4 shows a structural example of a balloon chuck (200). The balloon chuck (200) includes: a first opening (210); a second opening (220); a hollow portion (230) between the first opening (210) and the second opening (220); and a balloon (240) disposed around the hollow portion (230). The balloon (240) is disposed so as to surround the hollow portion (230), and a plurality of balloons (240) may be disposed as required.

The balloon chuck (200) according to the illustrated embodiment includes a side wall (270) having a plurality of through holes (260) on the outer peripheral side of the balloon (240). Further, an outer peripheral side of the side wall (270) is provided with a flow path (290) for a fluid (typically a gas such as air) that can enter and exit through a fluid port (280).

A method of using the balloon chuck (200) is now described. The pillar-shaped honeycomb structure (100) is inserted into the hollow portion (230) through the first opening (210) or the second opening (220). Then, when the fluid (typically a gas such as air) is fed through the fluid port (280) to the flow path (290), the fluid is injected into the balloon (240) through the through holes (260). As a result, when the balloon (240) expands toward the pillar-shaped honeycomb structure (100) inserted into the hollow portion (230), the pillar-shaped honeycomb structure (100) is fixed to the balloon chuck (200) by the pressing force from the balloon (240).

From the viewpoint of improving a light shielding property, it is preferable that when a coordinate axis is taken in the height direction (a length direction from the first end face to the second end face) of the pillar-shaped honeycomb structure (100), and a coordinate value at the second end face (106) is zero and a coordinate value at the first end face (104) is 100, it is desirable that the light shielding annular member (15) circumferentially cover the outer peripheral side surface (102) at any coordinate value of at least 0 to 50, and preferably at least 0 to 20, and more preferably at least 0 to 10. By circumferentially covering the outer peripheral side surface (102) on the side close to the second end face (106) with the light shielding annular member (15), the sneaking of the light from the light irradiator (12) can be effectively suppressed when the pattern of the transmitted light from the second end face (106) is captured with the camera (16). In addition to this, it is more desirable that the light shielding annular member (15) circumferentially cover the outer peripheral side surface (102) at any coordinate value of at least 50 to 100, and preferably at least 80 to 100, and more preferably at least 90 to 100. As used herein, the light shielding property is a concept including a light-reducing property, but the light shielding annular member (15) preferably has a light blocking percentage of 60% or more, and more preferably 80% or more, and even more preferably 99% or more, as defined in JIS L 1055: 2009.

In addition, the pattern of the reflected light from the second end face (106) may be captured with the camera (16) while circumferentially covering the outer peripheral side surface (102) of the pillar-shaped honeycomb structure (100) with the light shielding annular member (15), but it is not essential.

By the above method, the plugged portions (109) on one end face of the pillar-shaped honeycomb structure (100) can be inspected using the inspection system (100) according to the first embodiment of the present invention. In order to inspect the plugged portions (109) on the other end face, the pillar-shaped honeycomb structure (100) may be turned upside down and the same inspection may be performed.

3. Second Embodiment

FIGS. 1B to 1D each shows a schematic side view for explaining a configuration of an inspection system (20) according to the second embodiment of the present invention. A difference between the inspection system (20) according to the second embodiment and the inspection system (10) according to the first embodiment is that the former further includes a light diffusing film (14) arranged in parallel to the second end face (106). Other components represented by the same reference numerals as those in the first embodiment are the same as those already been described. Therefore, duplicate descriptions will be omitted.

The light diffusing film (14) is used when irradiating the first end face (104) of the pillar-shaped honeycomb structure (100) with the second light from the light irradiator (12b), and capturing the pattern of the transmitted light from the second end surface (106) according to the arrangement of each of the plugged portions (109) of the first cells (108) and the second cells (110) with the camera (16). The capturing of the pattern of the transmitted light from the second end face (106) via the light diffusing film (14) provides an advantage that the defective plugged portions are easily detected even if the squareness of the pillar-shaped honeycomb structure (100) is poor due to the influence of a dimensional error, i.e., the first end face (104) and the extending directions of the cells (108, 110) do not form a right angle, the second end face (106) and the extending directions of the cells (108, 110) do not form a right angle, or the extending direction of the cells are not straight but curved.

It is difficult for the camera (16) to capture the pattern of the reflected light from the second end face (106) via the light diffusion film (14). Therefore, when capturing the pattern of the reflected light, it is desirable to avoid the light diffusing film (14) from the second end face (106) so as not to interfere with the capturing. Therefore, when the light diffusion film (14) is used, it is common that the pattern of the reflected light and the pattern of the transmitted light are separately captured.

In the second embodiment, the light diffusing film (14) is configured such that it can be arranged parallel to the second end face (106) in a non-contact state with the second end face (106) of the pillar-shaped honeycomb structure (100). The light diffusing film (14) may be brought into contact with the second end face (106). However, the arrangement in the non-contact state is preferable, because the diffusing film (14) is not damaged by the contact with the second end face (106). The word "parallel" used in the phrase "the light diffusing film (14) is arranged parallel to the second end surface (106)" is a concept including mathematically exact parallel, as well as substantially parallel within a range that does not substantially affect the inspection accuracy. As an example, an average angle formed by the light diffusing film (14) and the second end face (106) of from 0° to 5° is included in the concept of parallel as used herein.

It is preferable that the light diffusing film (14) is arranged so as to cover the entire second end face (106), in terms of improving the inspection efficiency. Therefore, in one embodiment, an area of a main surface of the light diffusing film (14) is larger than that of the second end face (106) of the pillar-shaped honeycomb structure (100).

A distance between the light diffusing film (14) and the second end face (106) is not particularly limited. However, if it is too close, the light diffusing film (14) may be contacted with the second end face (106) due to vibration or the like. Therefore, the lower limit of the distance is preferably 1 mm or more, and more preferably 2 mm or more, and even more preferably 3 mm or more. Further, if the distance between the light diffusing film (14) and the second end face (106) is too long, the transmitted light of the adjacent cells overlaps to decrease the inspection accuracy. Therefore, the upper limit of the distance is preferably 100 mm or less, and more preferably 30 mm or less, and even more preferably 15 mm or less. As used herein, the distance between the light diffusing film (14) and the second end face (106) refers to a length of a straight line extending in the normal direction from the center of gravity of the second end face (106) to a position where the straight line is in contact with the light diffusing film (14).

A diffusion angle of the light diffusing film (14) is preferably from 10° to 90°, and preferably from 20° to 60°, and even more preferably from 20° to 30°, in terms of facilitating the inspection. The diffusion angle of the light diffusing film (14) can be adjusted by, for example, a method of adding a light scattering medium into the film, a method of adjusting a surface roughness, or the like. As used herein, the diffusion angle of the light diffusing film (14) is defined as an angle at which brightness (illuminance) is reduced by half with respect to a direction showing the maximum brightness (illuminance) (the normal direction of the film surface) when the film surface is irradiated with white light. The angle at which the brightness (illuminance) is reduced by half can be identified by finding the angle at which the brightness is reduced by half provided that the position for irradiating the light diffusing film (14) with white light and the measurement distance are fixed, using an illuminometer equipped with a pinhole in front, which is sufficiently smaller than the white light irradiation range.

A thickness of the light diffusing film (14) is not particularly limited. However, if it is too thick, the transmitted light of the adjacent cells overlaps, decreasing the inspection accuracy. Therefore, the thickness is preferably 50 mm or less, and more preferably 3 mm or less, and even more preferably 1 mm or less. If the thickness of the light diffusing film (14) is too thin, the strength will be insufficient and wrinkles, bending, or breakage will tend to occur. Therefore, the thickness is preferably 0.2 mm or more, and more preferably 0.5 mm or more.

A material of the light diffusing film (14) is not particularly limited. However, it is preferable that the material is a rigid material so as not to cause wrinkles or bending in terms of performing a stable inspection. For example, glass and plastics (polycarbonate and the like) can be used.

In order to stably fix the light diffusing film (14) to the interior of the system, the inspection system can be provided with at least one of the following parts (a) to (c) in one embodiment:
(a) a tensioner for applying tensile stress to the light diffusing film, the tensioner including at least one pair of grippers;
(b) two transparent plates for sandwiching the light diffusing film; and
(c) a transparent plate for attaching the light diffusing film.

In the embodiment shown in FIG. 1B, the inspection system (20) includes a tensioner (18) having a pair of grippers (18a). For example, the tensioner (18) can be configured such that the pair of grippers (18a) can sandwich the opposite edges of the light diffusing film (14) and pull them in opposite directions. By applying the tensile stress to the light diffusing film (14), wrinkles and bending can be prevented even if the light diffusing film (14) is thin or soft, so that the stable inspection can be performed. Further, the tensioner (18) may further include a second pair of grippers (18a) such that simultaneous pulling is also possible in the in-plane direction orthogonal to the pulling direction by the first pair of grippers (18a). This can allow the light diffusing film (14) to be pulled in four directions, so that the light diffusing film (14) can be more stably held.

In the embodiment shown in FIG. 1B, each gripper (18a) has a clamp mechanism provided with a pair of grip plates facing each other with one above the other. In one embodiment, the tensioner (18) can include a driving means for transmitting both a pressing force for gripping the light diffusing film (14) and a tensile stress for outwardly pulling the light diffusing film (14) to the grippers (18a). The driving means may employ any known means. For example, a spring, an electric cylinder or the like can be used as the driving means for transmitting the pressing force, and a turnbuckle, an electric cylinder or the like can be used as the driving means for transmitting the tensile stress.

In the embodiment shown in FIG. 10, the light diffusing film (14) is sandwiched from up and down directions by the two transparent plates (19). By sandwiching the light diffusing film (14) between the two transparent plates (19), wrinkles and bending can be prevented even if the light diffusing film (14) is thin or soft. Examples of the transparent plate (19) include, but not particularly limited to, a transparent glass plate and a transparent plastic plate (transparent polycarbonate plate, and the like). A thickness of the transparent plate (19) is generally thicker than that of the light diffusing film, and can be, for example, from 0.5 to 15 mm. A diffusion angle of the transparent plate (19) is generally 5° or less, typically 1° or less.

In the embodiment shown in FIG. 1D, the light diffusing film (14) is attached to the transparent plate (19). By attaching the light diffusing film (14) to the transparent plate (19), wrinkles and bending can be prevented even if the light diffusing film (14) is thin or soft. An example of a method of attaching the light diffusing film (14) to the transparent plate (19) includes a method of using a transparent adhesive. If the light diffusing film (14) is rigid and can ensure firmness, it may be sufficient to simply press the light diffusing film (14) against the transparent plate (19) by applying an external force. For instance, the light diffusing film (14) and the transparent plate (19) are attached together and their edges are sandwiched by a holder without using any adhesive. In the embodiment shown in FIG. 1D, the transparent plate (19) is arranged on a lower side of the light diffusing film, but the transparent plate (19) may be arranged on an upper side of the light diffusing film (14).

DESCRIPTION OF REFERENCE NUMERALS 10, 20 inspection system
12a, 12b light irradiator
13 housing
14 light diffusing film
15 light shielding annular member
16 camera
17 lens
18 tensioner
18a gripper
19 transparent plate
21 light shielding member
100 pillar-shaped honeycomb structure
102 outer peripheral wall
104 first end face
106 second end face
108 first cell
109 plugged portion
110 second cell 112 partition wall
200 balloon chuck
210 first opening
220 second opening
230 hollow portion
240 balloon
260 through hole
270 side wall
280 fluid port
290 flow path
300 computer
301 image processing unit
302 memory
303 calculation unit
304 display unit

The invention claimed is:

1. A method for inspecting a pillar-shaped honeycomb structure, the pillar-shaped honeycombs structure comprising: an outer peripheral side wall; a plurality of first cells disposed on an inner peripheral side than the outer peripheral side wall, each of the first cells extending from a first end face to a second end face, the first end face being opened and the second end face having plugged portions; and a plurality of second cells disposed on the inner peripheral side than the outer peripheral side wall, each of the second cells extending from the first end face to the second end face, the first end face having plugged portions and the second end face being opened, the first cells and the second cells being alternately arranged adjacent to each other interposing a partition wall therebetween, the method comprising steps of:

irradiating the second end face with a first light, capturing a pattern of reflected light from the second end face according to arrangement of each of the plugged portions of the first cells and the second cells with a camera, and generating an image data of the pattern of the reflected light;

distinguishing positional information of each of the second cells adjacent to the outer peripheral side wall and the second cells that are not adjacent to the outer peripheral side wall based on the generated image data of the pattern of the reflected light, and storing the positional information in a memory;

irradiating the first end face with a second light, capturing a pattern of transmitted light from the second end face according to arrangement of each of the plugged portions of the first cells and the second cells with the camera, and generating an image data of the pattern of the transmitted light;

based on the generated image data of the pattern of the transmitted light and the positional information stored in the memory, measuring intensity of each transmitted light from the second cells adjacent to the outer peripheral side wall, and comparing at least one first criterion for the intensity of the transmitted light with the intensity of the transmitted light to detect the second cells having defective plugged portions that are adjacent to the outer peripheral side wall, wherein the first criterion has been preset for identifying the second cells having the defective plugged portions that are adjacent to the outer peripheral side wall, or is determined based on the measured results; and based on the generated image data of the pattern of the transmitted light and the positional information stored in the memory, measuring intensity of each transmitted light from the second cells that are not adjacent to the outer peripheral side wall, and comparing at least one second criterion for the intensity of the transmitted light with the intensity of the transmitted light to detect the second cells having defective plugged portions that are not adjacent to the outer peripheral side wall, wherein the second criterion has been preset for identifying the second cells having the defective plugged portions that are not adjacent to the outer peripheral side wall, or is determined based on the measured results.

2. The method according to claim 1, wherein the at least one first criterion has both the first criterion for the intensity of the transmitted light which has been preset for identifying the second cells having the defective plugged portions that are adjacent to the outer peripheral side wall, and the first criterion for the intensity of the transmitted light which is determined based on the measured results, and wherein the at least one second criterion has both the second criterion for the intensity of the transmitted light which has been preset for identifying the second cells having the defective plugged portions that are not adjacent to the outer peripheral side wall, and the second criterion for the intensity of the transmitted light which is determined based on the measured results.

3. The method according to claim 1, wherein the pattern of the reflected light and the pattern of the transmitted light are simultaneously captured with the camera by using the first light and the second light having different wavelengths from each other.

4. A system for inspecting a pillar-shaped honeycomb structure, the pillar-shaped honeycombs structure comprising: an outer peripheral side wall; a plurality of first cells disposed on an inner peripheral side than the outer peripheral side wall, each of the first cells extending from a first end face to a second end face, the first end face being opened and the second end face having plugged portions; and a plurality of second cells disposed on the inner peripheral side than the outer peripheral side wall, each of the second cells extending from the first end face to the second end face, the first end face having plugged portions and the second end face being opened, the first cells and the second cells being alternately arranged adjacent to each other interposing a partition wall therebetween, the system comprising:

a light irradiator for irradiating the second end face with a first light;

a light irradiator for irradiating the first end face with a second light;

a camera for capturing a pattern of reflected light and a pattern of transmitted light from the second end face; and a computer capable of:

generating an image data of the pattern of the reflected light captured by the camera and an image data of the pattern of the transmitted light captured by the camera;

distinguishing positional information of each of the second cells adjacent to the outer peripheral side wall and the second cells that are not adjacent to the outer peripheral side wall based on the generated image data of the pattern of the reflected light, and storing the distinguished positional information in a memory;

based on the generated image data of the pattern of the transmitted light and the positional information stored in the memory, measuring intensity of each transmitted light from the second cells adjacent to the outer peripheral side wall, and comparing at least one first criterion for the intensity of the transmitted light with the intensity of the transmitted light to detect the second cells having defective plugged portions that are adjacent to the outer peripheral side wall, wherein the first criterion has been preset for identifying the second cells having the defective plugged portions that are adjacent to the outer peripheral side wall, or is determined based on the measured results; and based on the generated image data of the pattern of the transmitted light and the positional information stored in the memory, measuring intensity of each transmitted light from the second cells that are not adjacent to the outer peripheral side wall, and comparing at least one second criterion for the intensity of the transmitted light with the intensity of the transmitted light to detect the second cells having defective plugged portions that are not adjacent to the outer peripheral side wall, wherein the second criterion has been preset for identifying the second cells having the defective plugged portions that are not adjacent to the outer peripheral side wall, or is determined based on the measured results.

5. The system according to claim 4,
wherein the at least one first criterion has both the first criterion for the intensity of the transmitted light which has been preset for identifying the second cells having the defective plugged portions that are adjacent to the outer peripheral side wall, and the first criterion for the intensity of the transmitted light which is determined based on the measured results, and
wherein the at least one second criterion has both the second criterion for the intensity of the transmitted light which has been preset for identifying the second cells having the defective plugged portions that are not adjacent to the outer peripheral side wall, and the second criterion for the intensity of the transmitted light which is determined based on the measured results.

6. The system according to claim 4, wherein the light irradiator for irradiating with the first light can irradiate with light having a wavelength different from the light irradiator for irradiating with the second light.

* * * * *